US007650310B2

(12) United States Patent
Stefanescu

(10) Patent No.: US 7,650,310 B2
(45) Date of Patent: Jan. 19, 2010

(54) TECHNIQUE FOR REDUCING PHISHING

(75) Inventor: Costin Mugur Stefanescu, Waltham, MA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 11/928,521

(22) Filed: Oct. 30, 2007

(65) Prior Publication Data

US 2009/0112745 A1    Apr. 30, 2009

(51) Int. Cl.
*G06Q 40/00* (2006.01)
(52) U.S. Cl. ........................................................ 705/44
(58) Field of Classification Search ............... 705/1–45; 235/382; 380/201; 715/716
See application file for complete search history.

(56) References Cited

U.S. PATENT DOCUMENTS

| 2003/0046237 | A1* | 3/2003 | Uberti | 705/44 |
| 2004/0030607 | A1* | 2/2004 | Gibson | 705/26 |
| 2004/0236632 | A1* | 11/2004 | Maritzen et al. | 705/26 |
| 2005/0165668 | A1* | 7/2005 | Hinkle | 705/37 |
| 2005/0216768 | A1* | 9/2005 | Eppert | 713/201 |
| 2006/0089906 | A1* | 4/2006 | Rowley | 705/40 |
| 2008/0005037 | A1* | 1/2008 | Hammad et al. | 705/67 |

OTHER PUBLICATIONS

Secure transaction management. Intertrust Technologies Corp., Feb. 13, 1995.*
Mobile Electronic Commerce System. Matsushita Electric Industrial Co., LTD, Aug. 13, 1997.*

\* cited by examiner

*Primary Examiner*—Mary Cheung
*Assistant Examiner*—Tien C Nguyen
(74) *Attorney, Agent, or Firm*—Park, Vaughan & Fleming LLP

(57) ABSTRACT

Embodiments of a system that performs authentication during a financial transaction are described. During operation, this system asks a prospective customer a subset of questions from a set of questions, where the subset of questions has a probability of being different from those asked while previously or subsequently asking questions of the prospective customer or another prospective customer. Next, the system receives answers to the subset of questions from the prospective customer, thereby confirming that the prospective customer is a customer associated with a financial transaction. Then, the system provides transitory information associated with the financial transaction that, for the customer, uniquely identifies a provider of the financial transaction, thereby completing the authentication.

20 Claims, 5 Drawing Sheets

SUBSET OF QUESTIONS 410-1 / SUBSET OF QUESTIONS 410-2 / ...

TIME STAMP 412-1 | CUSTOMER 414-1 | QUESTION 416-1 | QUESTION 416-2 | QUESTION 416-3 | ...

TRANSITORY INFORMATION 510-1 / TRANSITORY INFORMATION 510-2 / ...

PROVIDER 512-1 | CUSTOMER 514-1 | INVOICE 516-1 | DESCRIPTION 518-1 | IMAGE 520-1 | ...

TECHNIQUE FOR REDUCING PHISHING

BACKGROUND

The present invention relates to techniques for authenticating parties during an on-line transaction. More specifically, the present invention relates to a system and a technique that reduces phishing by authenticating parties during a transaction.

While there has been considerable recent growth in on-line commerce, and more generally, in the use of the Internet to conduct financial transactions, data security for these on-line financial transactions remains a significant problem which can cause sensitive information to be misappropriated and/or misused.

One class of security problems is 'phishing,' during which a malicious user tricks a victim into accepting a false identity, which enables the malicious user to access or obtain sensitive information (such as a credit-card number, a bank-account number, a social-security number, or a username and password). For example, the malicious user may send an email falsely claiming to be an established, legitimate enterprise in an attempt to scam the victim into providing sensitive information that can be used for identity theft. In some cases, the email may include a link to a fake website (which is a replica of a trusted website) where the sensitive information is requested.

Unfortunately, phishing often mimics the same techniques that are used in on-line financial transactions. In particular, email is a convenient communication technique for sending invoices to customers, and payment for many invoices is often implemented by linking a customer to a payment web page, where the customer can complete the financial transaction. Moreover, to keep the process simple (and thus, to facilitate use of such services), many payment web pages avoid a lengthy registration process, and thus, do not ask customers to login, thereby exacerbating the security risk.

Hence, phishing undermines confidence in the safety of on-line commerce.

SUMMARY

One embodiment of this invention relates to a system that performs authentication during a financial transaction. During operation, this system asks a prospective customer a subset of questions from a set of questions, where the subset of questions has a probability of being different from those asked while previously or subsequently asking questions of the prospective customer or another prospective customer. Next, the system receives answers to the subset of questions from the prospective customer, thereby confirming that the prospective customer is a customer associated with a financial transaction. Then, the system provides transitory information associated with the financial transaction that, for the customer, uniquely identifies a provider of the financial transaction, thereby completing the authentication.

In some embodiments, the system receives payment information from the customer for the financial transaction.

In some embodiments, the system provides an identifier to the customer that uniquely identifies the customer during subsequent financial transactions. Moreover, information associated with the identifier may be stored on a computer used by the customer. For example, the storage mechanism may include a cookie, such as an HTTP cookie.

In some embodiments, the transitory information includes: an invoice, a price parameter for the financial transaction, an image of an article to be purchased or a service that has been rendered, and/or a description of an article to be purchased or a service that has been rendered.

In some embodiments, the subset of questions is selected randomly or pseudo-randomly from the set of questions.

In some embodiments, the difference includes at least some different questions and/or a different order of the questions. Moreover, in some embodiments the subset of questions includes different permutations and/or combinations of questions in the set of questions each time questions are asked of the prospective customer or other prospective customers.

In some embodiments, prior to asking the prospective customer the subset of the questions, the system receives a request for the subset of questions from the prospective customer. For example, the prospective customer may access a website to perform a financial transaction. Moreover, in response to a subsequent request from the prospective customer after the request, another subset of questions may be provided only if the subsequent request occurs after a minimum time interval has elapsed since the request.

Another embodiment relates to a computer program product for use in conjunction with the system. This computer program product may include instructions corresponding to at least some of the above-described operations.

Another embodiment provides a method for performing authentication during a financial transaction. This method may perform at least some of the above-described operations.

BRIEF DESCRIPTION OF THE FIGURES

FIG. 4 is a block diagram illustrating a data structure in accordance with an embodiment of the present invention.

FIG. 5 is a block diagram illustrating a data structure in accordance with an embodiment of the present invention.

Figure 1:
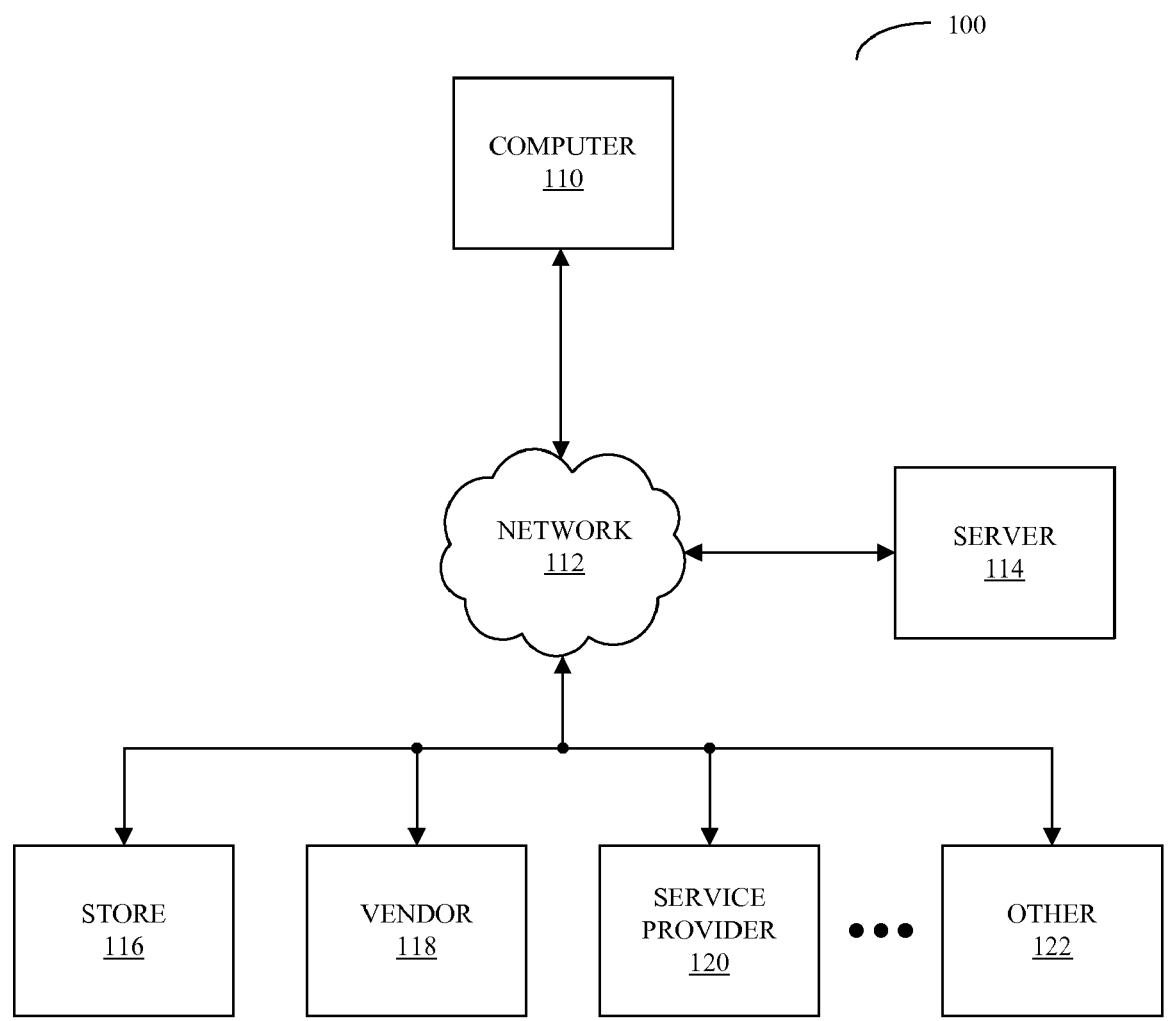
FIG. 1 is a block diagram illustrating a computer system including computers and servers that are networked together in accordance with an embodiment of the present invention.

Table 1 provides pseudo-code in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These systems, software, and processes may be used to authenticate parties during a financial transaction. In particular, a phisher may be prevented from presenting a fake website that mimics a real website associated with an established, legitimate enterprise by restricting access to the content associated with the real website. When a new customer attempts to access a payment website (for example, by activating a link in an email), the new customer is asked a subset of a set of questions, such as simple information that should be known by the customer (for example, their zip code, a particular letter in their street name, their city of residence, their date of birth, a type of service or product that is to be purchased, etc.). To reduce the likelihood that a phisher can scrape this content in order to establish a fake website, questions in the subset and/or the order of the questions may be varied, randomly, each time a new customer attempts to access the payment website.

After answering these questions, which uniquely identify the new customer, the new customer is provided with information associated with the financial transaction, such as: an invoice, a price, an image, and/or a description of an article that is to be purchased or a service that has been or will be provided. Because this information is only valid for a particular transaction (consequently, it is henceforth referred to as 'transitory information'), it uniquely identifies the provider of the financial transaction.

In some embodiments, during and/or after the authentication, the new customer is provided with an identifier, such as a cookie, which identifies this customer (via their computer) during future transactions. Consequently, so long as the identifier is stored on a particular computer, a given customer may only be asked a subset of the questions the first time the given customer accesses the payment website from the particular computer. During the subsequent access to the payment web page or website, the customer's computer will communicate the cookie to the payment web page for authentication purposes.

These techniques may be implemented as a stand-alone software application, or as a program module or subroutine in another application. Furthermore, at least a portion of the program may be configured to execute on a client computer (such as a personal computer, a laptop computer, cell phone, PDA, or other device capable of manipulating computer readable data) or remotely from a client computer via associated computing systems over a network (such as the Internet, Intranet, LAN, WAN, MAN, or combination of networks, or other technology enabling communication between computing systems). Therefore, the authentication information (such as the questions, the answers, and/or the transitory information) may be stored locally (for example, on a local computer) and/or remotely (for example, on a computer or server that is accessed via a network).

By authenticating both parties during a financial transaction, this technique may facilitate on-line commerce, such as payment for a financial transaction in response to an electronic invoice. In particular, once both parties have been authenticated, the customer can provide the payment information, thereby completing the financial transaction, with confidence that the payment information will not be misused by a third party. Additionally, the provider of the payment website is confident that they are interacting with an actual customer, as opposed to a phisher that is trying to scrape the content of the provider's website. Note that this intuitive approach facilitates authentication without requiring the customer to register via a lengthy sign-up process and without requiring the customer to memorize a complicated username or password.

We now describe embodiments of systems, devices, and processes for performing authentication during a financial transaction. FIG. 1 presents a block diagram illustrating an embodiment of a computer system 100 including computers and servers that are networked together. In this embodiment, a customer using a computer 110 may have purchased or may desire to purchase a product. Alternatively, this customer may have previously received services from a service provider, such as a contractor (for example, a plumber may have performed repairs at a customer's house), or may desire to receive services from the service provider. In order to receive payment, the provider of the product or service (such as a store 116, a vendor 118, a service provider 120, and/or another entity 122), may submit an invoice and/or information associated with the financial transaction to a provider of a payment service. For example, this invoice and/or the information associated with the financial transaction may be submitted to a server 114, which hosts the payment service, via a network 112, such as the Internet.

Next, the server 114 may send an electronic notification (such as an email) to the computer 110 via the network 112. This electronic notification may include a link to a payment web page or website that is hosted on the server 114. As described further below, this electronic notification may be provided as a stand-alone message or may be provided within an environment, such as an application program. Moreover, subsequent communication during the mutual authentication process may be implemented via a stand-alone application or via the application program (for example, using an embedded software tool), where portions of either may be resident on the computer 110 and/or the server 114.

When the customer activates the link, for example, by clicking on it, instructions for a web page may be provided by the server 114. These instructions may be rendered by a browser and viewed by the customer. In addition, when the link is activated, a request may be transmitted to the server 114. In response to this request, a subset of questions from a set of questions may be asked to the customer. This subset may be generated dynamically or may be pre-determined. For example, a given subset, including the particular questions and/or the order of the questions, may be randomly or pseudo-randomly selected from the set of questions. In general, the subset of questions includes different permutations and/or combinations of questions in the set of questions each time questions are asked of the prospective customer and/or other prospective customers.

Answers provided by the customer in response to these questions may be used by a provider of the payment service to uniquely identify the customer. For example, the questions may include simple information that should be known by the customer, such as: their zip code, a particular letter in their street name, their city or state of residence, their date of birth, a type of service or product that is to be purchased, etc. Note that because this information is simple, there is no need for the customer to register on the payment web page or to memorize a username or password.

Moreover, by varying the subset of questions (with a given instance of the subset having a probability P) it will be more difficult for a malicious user to scrape the content from the web page for illicit purposes. While there is a small probability that the same subset of questions may be asked on two consecutive occasions, in general the malicious user or an agent acting on behalf of the malicious user will have to repeatedly access the web page to obtain all of the possible questions, and thus, will have to repeatedly request subsets of questions and provide appropriate answers. This time-consuming process makes it less likely that the malicious user can access the web page and its content. Moreover, in some embodiments the number of retries may be limited.

To further confound brute-force attempts to defeat the variation in the subset of questions, in some embodiments the server 114 does not allow subsequent requests from the same computer 110 and/or Internet-protocol address (i.e., does not provide an additional instance of the subset of questions) unless the subsequent request occurs after a minimum time interval has elapsed since the prior request. In this way, if the probability of generating the same questionnaire as the real payment web page is n %, it will be difficult for the malicious user to request a sufficient number of instances of the subset of questions to enable the malicious user to reproduce a given instance of the subset of questions with high confidence.

However, even if the malicious user is able to access the web page, the content provided includes transitory information, which, in principle, only has relevance to a single customer on one occasion. As such, this content cannot be used reused in 'fake' web page during a phishing attack.

In particular, once the identity of the customer has been confirmed, server 114 provides the aforementioned transitory information associated with the financial transaction. For example, the transitory information may include: an invoice, a price parameter associated with the financial transaction, an image of an article to be purchased or a service that has been rendered, and/or a description of an article to be purchased or a service that has been rendered. This information is uniquely associated with the financial transaction, and as such, uniquely identifies the provider of the product or service (via the payment web page) to the customer. This transitory information completes the authentication process and builds customer confidence. At this point, the customer is willing to complete the financial transaction by providing payment information, such as a credit-card number and/or a bank-account number.

In some embodiments, after the authentication is completed, server 114 provides an identifier to the customer that uniquely identifies the customer during subsequent financial transactions. For example, information associated with this identifier (such as a cookie) may be stored on the computer 110. During a subsequent financial transaction, if an application, which is resident on the computer 110 and/or the server 114, detects the presence of the identifier, the identity of the customer may be confirmed. Consequently, in these embodiments it may not be necessary to ask an instance of the subset of questions or the number of questions in this instance of the subset of questions may be reduced.

Note that additional security and/or confidence-building techniques may be used in conjunction with the authentication process. For example, once the identity of the customer is confirmed, the web page may display an image and/or text that is associated with the real payment web page and/or the provider or the product or service. Moreover, a given message between the computer 110 and the server 114 may include a digital signature, thereby confirming that the message came from a valid source. Additionally, in some embodiments messages between the computer 110 and the server 114 are encrypted. For example, after the identity of the customer is confirmed, one or more decryption keys and/or one or more encryption keys may be exchanged between computer 110 and server 114, thereby facilitating communication via techniques such as public-private key encryption. Alternative, encryption may be applied during the entire conversation or authentication process to prevent unauthorized sniffing or monitoring of communications.

Note that applications and/or modules used during the authentication process may be stand-alone applications on the computer 110 and/or may be embedded in another application. For example, one or more modules used during the verification process may be included in a software product, such as income-tax preparation software and/or financial-accounting software.

In some embodiments, the income-tax software includes: TurboTax™ (from Intuit, Inc., of Mountain View, Calif.), TaxCut™ (from H&R Block, Inc., of Kansas City, Mo.), TaxAct™ (from $2^{nd}$ Story Software, Inc., of Cedar Rapids, Iowa), and/or other software capable of preparing an income-tax return. Furthermore, in some embodiments the financial-accounting software includes payroll-accounting software, such as QuickBooks™ (from Intuit, Inc., of Mountain View, Calif.), PeachTree Complete™ (from the Sage Group PLC, of London, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Small Business Manager™ (from Microsoft Corporation, of Redmont, Washinton), Simply Accounting™ (from the Sage Group PLC, of London, the United Kingdom), CYMA IV Accounting™ (from CYMA Systems, Inc., of Temple, Ariz.), DacEasy™ (from Sage Software SB, Inc., of Lawrenceville, Ga.), Microsoft Money™ (from Microsoft Corporation, of Redmont, Washinton), and/or other financial-accounting software capable of processing payroll information. Finally, in some embodiments the financial-accounting software includes financial-planning software, such as Quicken™ (from Intuit, Inc., of Mountain View, Calif.), Microsoft Money™ (from Microsoft Corporation, of Redmont, Washinton), SplashMoney™ (from SplashData, Inc., Los Gatos, Calif.), Mvelopes™ (from In2M, Inc., Draper, Utah), and/or open-source applications such as Gnucash™, PLCash™, Budget™ (from Snowmint Creative Solutions, LLC), and/or other financial-planning software capable of processing financial information.

While the stand-alone application and/or the software product may be resident on the computer 110, other embodiments may utilize a software tool that is embedded in a web page (once again, either as a stand-alone application or as a portion of another application). This web page may be provided by a server 114 via network 112. In an exemplary embodiment, this software tool is a software package written in JavaScript™ (i.e., the software tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the software tool may include programs or procedures containing JavaScript, ECMAScript instructions, VBScript instructions, or instructions in another programming language suitable for rendering by a browser or another client application on the computer 110. In these embodiments, instructions provided with the payment web page or previously provided to the computer 110 may be used to dynamically enable access to the software tool.

In an exemplary embodiment, the subset of questions includes four questions and the set of questions includes eleven questions. Consequently, there are C(4,11) or 330 possible subsets, and the probability that a given instance of the subset of questions repeats is approximately 0.3% (if a perfectly random generator is used).

Moreover, in an exemplary embodiment each question after the first question in a given subset of questions may only be displayed after a correct answer has been received for the previous question. Additionally, if the customer makes a mistake in answering one of the questions in the subset of question, an additional challenge question may be asked.

In some embodiments the computer system 100 includes fewer or additional components. Moreover, two or more components can be combined into a single component, and/or a position of one or more components may be changed.

Figure 2A:
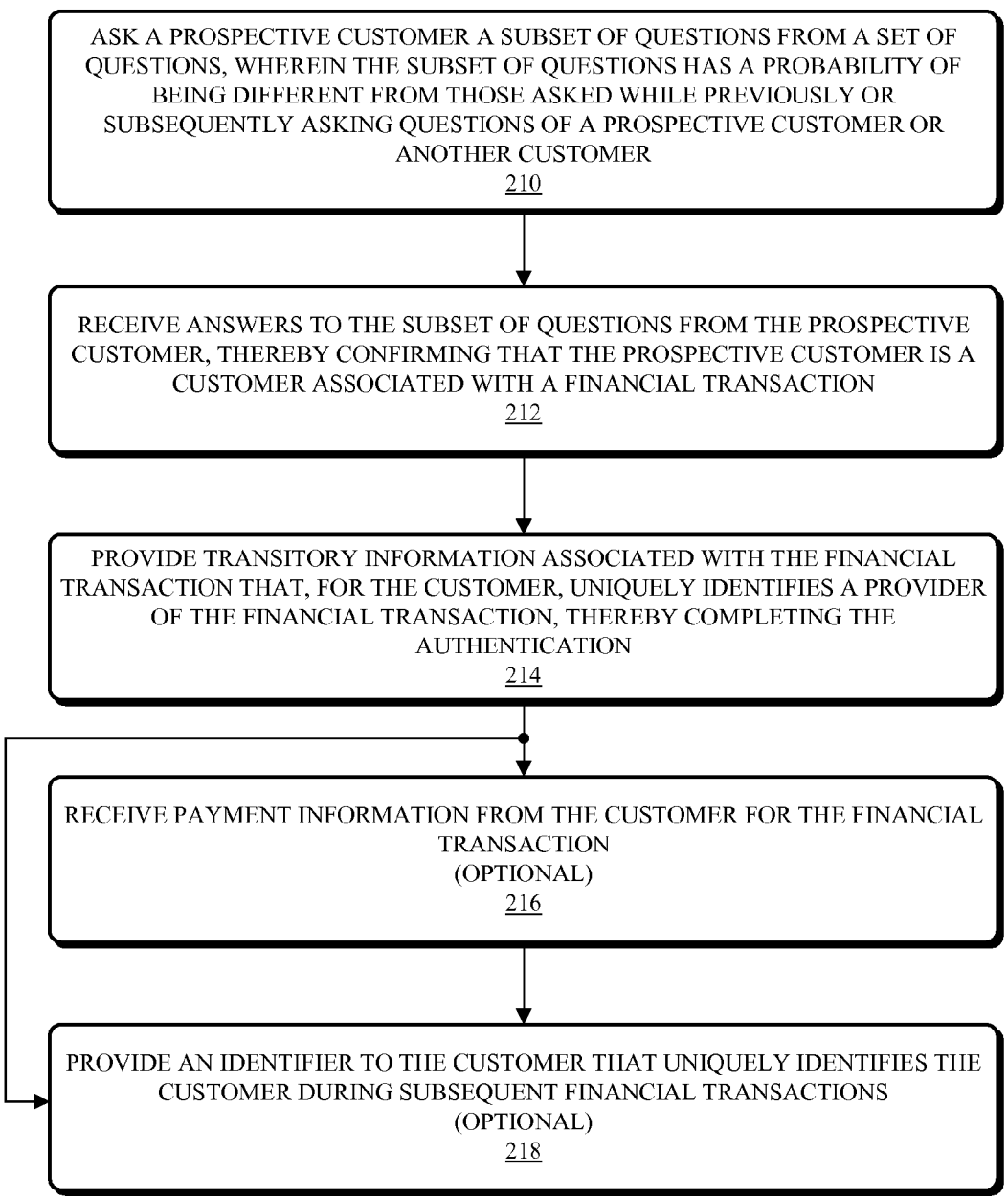
FIG. 2A is a flow chart illustrating a method for performing authentication during a financial transaction in accordance with an embodiment of the present invention.

We now discuss methods for providing authentication during a financial transaction. FIG. 2A presents a flow chart illustrating an embodiment of a method 200 for performing authentication during a financial transaction, which may be performed by a system, such as the computer system 100 (FIG. 1). During operation, this system asks a prospective customer a subset of questions from a set of questions, where the subset of questions has a probability of being different from those asked while previously or subsequently asking questions of the prospective customer or another prospective customer (210). Next, the system receives answers to the subset of questions from the prospective customer (212), thereby confirming that the prospective customer is a customer associated with a financial transaction. Then, the system provides transitory information associated with the financial transaction that, for the customer, uniquely identifies a provider of the financial transaction (214), thereby completing the authentication.

In some embodiments, the system optionally receives payment information from the customer for the financial transaction (216). Moreover, in some embodiments, the system optionally provides an identifier to the customer that uniquely identifies the customer during subsequent financial transactions (218).

Figure 2B:
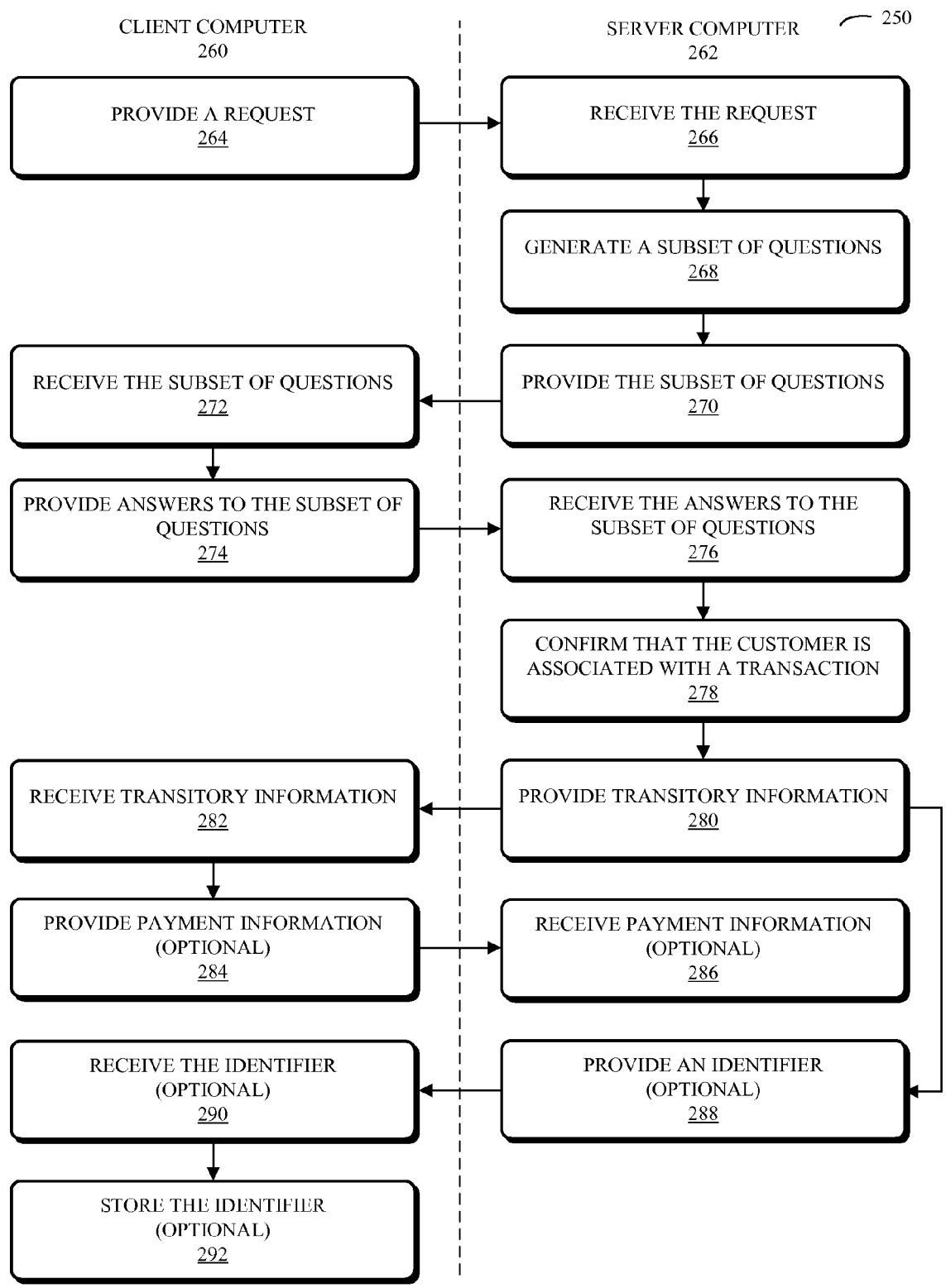
FIG. 2B is a flow chart illustrating a method for performing authentication during a financial transaction in accordance with an embodiment of the present invention.

FIG. 2B presents a flow chart illustrating an embodiment of a method 200 for performing authentication during a financial transaction, which may be performed by a system, such as the computer system 100 (FIG. 1). During operation, a customer at a client computer 260 provides a request (264). This request is received (266) at a server computer 262. In response, the server computer 262 generates a subset of questions (268), which are provided (270) either sequentially or all at once.

After receiving one or more of the questions in the subset of questions (272), the customer provides answers (274), which are received (276) and are used to confirm the identity of the customer (278). Once the customer's identity has been confirmed, the server computer 262 provides transitory information (280) associated with a financial transaction, which, when received by the customer (282), uniquely identifies a provider of the server computer 262 and the associated payment web page.

In some embodiments, in response to the transitory information, the customer optionally provides payment information (284), which is received (286) by the server computer 262. Moreover, in some embodiments, after the customer has been uniquely identified, the server computer 262 optionally provides an identifier (288), which is received (290) and/or stored (292) on the client computer 260.

Note that in some embodiments of the methods 200 (FIG. 2A) and/or 250 there may be additional or fewer operations. Moreover, the order of the operations may be changed and/or two or more operations may be combined into a single operation.

While the preceding embodiments have illustrated the technique for reducing phishing using a subset of questions that are selected or computed and sent to a customer, in other embodiments the subset of questions is generated incrementally, e.g., the full subset of questions may not computed at the start of the technique. In this alternate approach, the cardinality of the subset of questions may vary from one instance of the subset of questions to another. This approach may allow a customer, who makes a mistake when answering a given question in the subset, to recover graciously by answering more, and possibly, more difficult questions. Table 1 provides pseudo-code in accordance with an embodiment of the present invention.

TABLE 1

```
max_tries = A;
subset_size = B;
while subset_size > 0 and max_tries not exceeded
    subset_size--;
    choose_query(difficulty);
    ask query;
    if answer incorrect
        increase difficulty;
        and/or;
        subset_size++;
        max_tries++;
end while.
```

Figure 3:
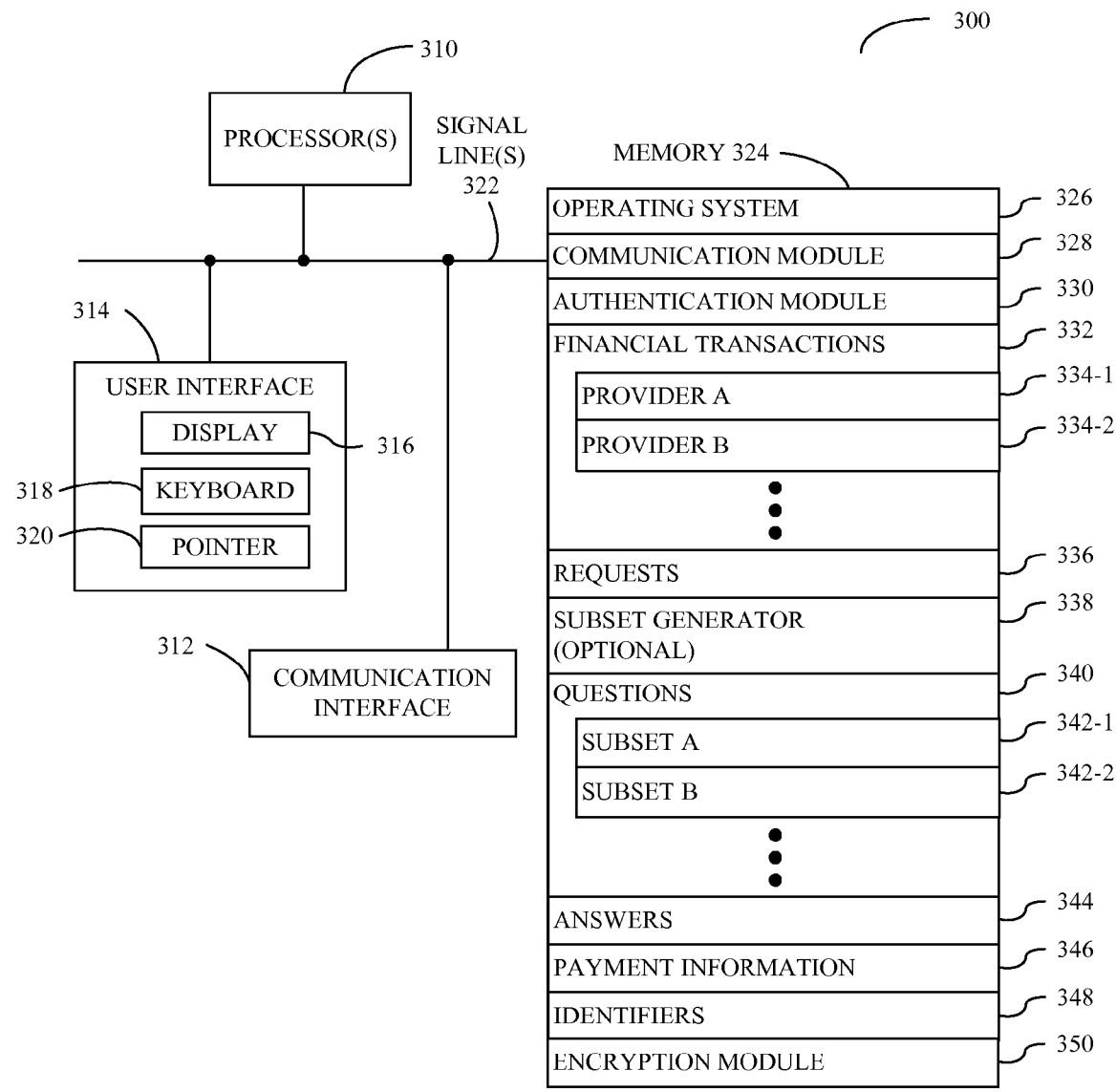
FIG. 3 is a block diagram illustrating a computer system in accordance with an embodiment of the present invention.

We now describe computer systems for implementing these techniques. FIG. 3 presents a block diagram illustrating an embodiment of a computer system 300 (such as server 114 in FIG. 1). Computer system 300 includes: one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash, one or more smart cards, one or more magnetic disc storage devices, and/or one or more optical storage devices. Memory 324 may store an operating system 326 that includes procedures (or a set of instructions) for handling various basic system services for performing hardware dependent tasks. While not shown in the computer system 100, in some embodiments memory 324 includes a browser. Memory 324 may also store communication procedures (or a set of instructions) in a communication module 328. These communication procedures may be used for communicating with one or more computers and/or servers, including computers and/or servers that are remotely located with respect to the computer system 300.

Memory 324 may include multiple program modules (or a set of instructions), including authentication module 330 (or a set of instructions) and/or encryption module 350 (or a set of instructions). Authentication module 330 may provide a subset (such as subset A 342-1 or subset B 342-2) of questions 340 in response to one or more requests 336 from a customer. Note that in some embodiments subsets 342 are pre-determined. However, in some embodiments a given subset (such as subset A 342-1) is dynamically generated using an optional subset generator 338 (or a set of instructions).

Authentication module 330 may process answers 344 from the customer to confirm the customer's identity. Once the customer's identity is confirmed, authentication module 330 may provide to the customer transitory information, such as information associated with one or more financial transactions 332, including financial transactions associated with one or more providers 334 (such as provider A 334-1 and/or provider B 334-2).

This transitory information may confirm the identity of the provider of the payment web page, thus completing the authentication process. Subsequently, the customer may provide payment information 346 for one or more of the financial transactions 332 and/or one or more identifiers 348 (such as a cookie) may be provided to the customer to, at least in part, identify the customer during subsequent financial transactions.

Instructions in the various modules in the memory 324 may be implemented in a high-level procedural language, an object-oriented programming language, and/or in an assembly or machine language. The programming language may be compiled or interpreted, i.e., configurable or configured to be executed by the one or more processing units 310.

Although the computer system 300 is illustrated as having a number of discrete components, FIG. 3 is intended to provide a functional description of the various features that may be present in the computer system 300 rather than as a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more ASICs and/or one or more digital signal processors DSPs.

Computer system 300 may include fewer components or additional components. Moreover, two or more components may be combined into a single component and/or a position of one or more components may be changed. In some embodiments the functionality of the computer system 300 may be implemented more in hardware and less in software, or less in hardware and more in software, as is known in the art.

We now describe data structures that may be used in the computer system 100 (FIG. 1) and/or 300 (FIG. 3). FIG. 4 presents a block diagram illustrating an embodiment of a data structure 400. This data structure may include subsets of questions 410. More specifically, a given subset of questions 410, such as subset of questions 410-1, may include: a time stamp 412-1, an associated customer 414-1, and one or more questions 416-1 from a set of questions.

FIG. 5 presents a block diagram illustrating an embodiment of a data structure 500. This data structure may include transitory information 510 associated with financial transactions. Such transitory information, such as transitory information 510-1, may include: a provider 512-1, a customer 514-1, an invoice 516-1, a description of a product or service 518-1, and/or an image 520-1 that is associated with the product or service.

Note that that in some embodiments of the data structures 400 (FIG. 4) and/or 500 there may be fewer or additional components. Moreover, two or more components may be combined into a single component, and/or a position of one or more components is changed.

While the preceding embodiments have used authentication performed during a financial transaction as an illustrative embodiment, the authentication technique may be used during a wide variety of types of communication and/or transactions, including non-financial transactions, between two or more parties.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for authenticating a financial transaction, comprising:
    at a server computer, performing a two-way authentication by:
        asking a prospective customer a subset of questions from a set of questions, wherein the subset of questions has a probability of being different from those asked while previously or subsequently asking questions of the prospective customer or another prospective customer;
        receiving answers to the subset of questions from the prospective customer, thereby confirming that the prospective customer is a customer associated with a financial transaction; and
        providing transitory information uniquely associated with the financial transaction to the perspective customer, wherein the transitory information uniquely identifies a provider of the financial transaction and associated payment webpage, thus authenticating the provider of the financial transaction and the associated webpage to the perspective customer, thereby completing the two-way authentication.

2. The method of claim 1, further comprising receiving payment information from the customer for the financial transaction.

3. The method of claim 1, further comprising providing an identifier to the customer that uniquely identifies the customer during subsequent financial transactions.

4. The method of claim 3, wherein information associated with the identifier is stored on a computer used by the customer.

5. The method of claim 4, wherein information is stored in a cookie.

6. The method of claim 1, wherein the transitory information includes an invoice.

7. The method of claim 1, wherein the transitory information includes a price parameter for the financial transaction.

8. The method of claim 1, wherein the transitory information includes an image of an article to be purchased or a service that has been rendered.

9. The method of claim 1, wherein the transitory information includes a description of an article to be purchased or a service that has been rendered.

10. The method of claim 1, wherein the subset of questions is selected randomly or pseudo-randomly from the set of questions.

11. The method of claim 1, wherein the subset of questions includes different permutations or combinations of questions in the set of questions each time questions are asked of the prospective customer or other prospective customers.

12. The method of claim 1, wherein the difference includes at least some different questions.

13. The method of claim 1, wherein the difference includes a different order of the questions.

14. The method of claim 1, wherein prior to asking the prospective customer the subset of the questions, the method further comprises receiving a request for the subset of questions from the prospective customer.

15. The method of claim 14, wherein, in response to a subsequent request from the prospective customer after the request, another subset of questions is provided only if the subsequent request occurs after a minimum time interval has elapsed since the request.

16. A computer-program product for use in conjunction with a computer system, the computer program product comprising a computer-readable storage medium and a computer-program mechanism embedded therein for configuring the computer system, the computer-program mechanism including:

instructions for asking a prospective customer a subset of questions from a set of questions, wherein the subset of questions has a probability of being different from those asked while previously or subsequently asking questions of the prospective customer or another prospective customer;

instructions for receiving answers to the subset of questions from the prospective customer, thereby confirming that the prospective customer is a customer associated with a financial transaction; and instructions for providing transitory information uniquely associated with the financial transaction to the perspective customer, wherein the transitory information uniquely identifies a provider of the financial transaction and associated payment webpage, thus authenticating the provider of the financial transaction and the associated webpage to the perspective customer, thereby completing a two-way authentication.

17. The computer-program product of claim 16, wherein the subset of questions are selected randomly or pseudo-randomly from the set of questions.

18. The computer-program product of claim 16, wherein the difference includes at least some different questions.

19. The computer-program product of claim 16, wherein the difference includes a different order of the questions.

20. A computer system, comprising:

a processor;

memory;

a program module, wherein the program module is stored in the memory and configurable to be executed by the processor, the program module including:

instructions for asking a prospective customer a subset of questions from a set of questions, wherein the subset of questions has a probability of being different from those asked while previously or subsequently asking questions of the prospective customer or another prospective customer;

instructions for receiving answers to the subset of questions from the prospective customer, thereby confirming that the prospective customer is a customer associated with a financial transaction; and instructions for providing transitory information uniquely associated with the financial transaction to the perspective customer, wherein the transitory information uniquely identifies a provider of the financial transaction and associated payment webpage, and wherein the transitory information is used to authenticate the provider of the financial transaction and the associated webpage to the perspective customer, thereby completing a two-way authentication.

\* \* \* \* \*